United States Patent [19]
Berg et al.

[11] Patent Number: 5,236,564
[45] Date of Patent: Aug. 17, 1993

[54] PROCESS FOR THE COATING OF ELECTRICALLY CONDUCTING SUBSTRATES

[75] Inventors: Jan Berg, Münster; Rainer Burstinghaus, Telgte, both of Fed. Rep. of Germany; Hans-Joachim Streitberger, Birmingham, Mich.; Jürgen Hambrecht, Neustadt-Hambach, Fed. Rep. of Germany

[73] Assignee: BASF Lacke + Farben Aktiengesellschaft, Munster, Fed. Rep. of Germany

[21] Appl. No.: 784,433

[22] PCT Filed: Apr. 25, 1990

[86] PCT No.: PCT/EP90/00669
 § 371 Date: Nov. 7, 1991
 § 102(e) Date: Nov. 7, 1991

[87] PCT Pub. No.: WO90/13686
 PCT Pub. Date: Nov. 15, 1990

[30] Foreign Application Priority Data
 May 9, 1989 [DE] Fed. Rep. of Germany ....... 3915080

[51] Int. Cl.$^5$ .............................................. C25D 13/12
[52] U.S. Cl. .............................. 204/181.1; 204/181.7; 427/488
[58] Field of Search ......................... 204/181.1, 181.7; 427/38, 41

[56] References Cited
U.S. PATENT DOCUMENTS
4,980,196 12/1990 Yasuda et al. ......................... 427/38

*Primary Examiner*—John Niebling
*Assistant Examiner*—Kishor Mayekar
*Attorney, Agent, or Firm*—Frank G. Werner; Anne Gerry Sabourin

[57] ABSTRACT

The invention relates to a process for the coating of electrically conducting substrates in which
(1) the substrate is immersed in an aqueous electrocoating paint comprising at least one cathodically depositable resin,
(2) the substrate is connected as cathode,
(3) a film is deposited on the substrate using direct current,
(4) the substrate is removed from the electrocoating paint and
(5) the deposited paint film is baked.

In this invention an electrically conducting substrate coated by a coating produced by plasma polymerization is employed as substrate.

1 Claim, No Drawings

PROCESS FOR THE COATING OF ELECTRICALLY CONDUCTING SUBSTRATES

The invention relates to a process for the coating of electrically conducting substrates in which
(1) the substrate is immersed in an aqueous electrocoating paint comprising at least one cathodically depositable binder,
(2) the substrate is connected as cathode,
(3) a film is deposited on the substrate using direct current,
(4) the substrate is removed from the electrocoating paint and
(5) the deposited paint film is baked.

The cathodic electrocoating process described above is a painting process frequently used especially for priming.

Processes of the type described above are disclosed, for example, in the following patents: DE-OS 3,518,732, DE-OS 3,518,770, EP-A-4,090, EP-A-12,463, DE-PS 3,445,857, EP-A-59,895, EP-A-74,634, U.S. Pat. No. 3,984,299, EP-A-70,550 and DE-OS 2,701,002.

The object forming the basis of the present invention is to improve the process described above.

Surprisingly, this object is achieved by a process outlined in the preamble of claim 1, which employs an electrically conducting substrate coated by a coating produced by plasma polymerization.

The electrocoating baths used according to the invention may comprise in principle any cathodically depositable non-self-crosslinking or self-crosslinking resins which are suitable for the formulation of electrocoating baths. The electrocoating baths used according to the invention may also comprise mixtures of various cathodically depositable resins.

The electrocoating baths preferred, however, are those which comprise cationic amine-modified epoxy resins as the cathodically depositable resins. Both self-crosslinking and non-self-crosslinking cationic amine-modified epoxy resins are known. Non-self-crosslinking cationic amine-modified epoxy resins are preferably used.

The term 'cationic amine-modified epoxy resins' is understood to mean cationic reaction products obtained by reacting
(A) modified or unmodified polyepoxides with
(B) amines.

The term 'polyepoxides' is understood to mean compounds containing two or more epoxide groups in the molecule.

Particularly preferred components (A) are compounds which can be prepared by reacting
(a) a diepoxide compound or a mixture of diepoxide compounds of an epoxide equivalent weight below 2,000 with
(b) a compound containing a phenol or thiol group which reacts monofunctionally towards epoxide groups under the given reaction conditions or a mixture of such compounds, the components (a) and (b) being used in the molar ratio of 10:1 to 1:1, preferably 4:1 to 1.5:1 and the reaction of the component (a) with the component (b) being carried out at 100° to 190° in the presence or absence of a catalyst (cf. DE-OS 3,518,770).

Other particularly preferred components (A) are compounds which can be prepared in the presence or absence of a catalyst by polyaddition, initiated by a monofunctionally reacting initiator which contains either an alcoholic OH group or a phenolic OH group or an SH group, of a diepoxide compound and/or a mixture of diepoxide compounds, in the presence or absence of at least one monoepoxide compound, to an epoxy resin in which the diepoxide compound and initiator are incorporated in a molar ratio of greater [sic] 2:1 to 10:1 (cf. DE-OS 3,518,732).

Polyepoxides which can be employed for the preparation of the particularly preferred components (A) and even used as the components (A) themselves, are polyglycidyl ethers of polyphenols prepared from polyphenols and epihalohydrins. Bisphenol A and bisphenol F, for example, are used most preferably as the polyphenols. 4,4'-Dihydroxybenzophenone, bis(4-hydroxyphenyl)-1,1-ethane, bis(4-hydroxyphenyl)-1,1-isobutane, bis(4-hydroxy-tert.-butylphenyl)-2,2-propane, bis(2-hydroxynaphthyl)methane, 1,5-dihydroxynaphthalene and phenolic novolak resins are also suitable.

Other suitable polyepoxides are polyglycidyl ethers of polyhydric alcohols, for example ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane.

Polyglycidyl esters of polycarboxylic acids, for example oxalic acid, succinic acid, glutaric acid, terephthalic acid, 2,6-naphthalenedicarboxylic acid and dimerized linoleic acid may also be used. Typical examples are glycidyl adipate and glycidyl phthalate.

Other suitable compounds are hydantoin epoxides, epoxidized polybutadiene and polyepoxide compounds which are obtained by epoxidization of an olefinically unsaturated aliphatic compound.

The term 'modified polyepoxides' are understood to mean polyepoxides in which some of the reactive groups have been reacted with a modified compound.

Examples of modified compounds are:
a) Compounds containing carboxyl groups, such as saturated or unsaturated monocarboxylic acids (for example benzoic acid, linseed oil fatty acid, 2-ethylhexanoic acid, versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, dimethylolpropionic acid) as well as polyesters containing carboxyl groups, or
b) compounds containing amino groups, such as diethylamine or ethylhexylamine or diamines with secondary amino groups, for example N,N'-dialkylalkylenediamines, such as dimethylethylenediamine, N,N'-dialkylpolyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines such as bis-N,N'-cyanoethylpolyoxypropylenediamine, polyaminoamides, such as versamides, in particular reaction products containing terminal amino groups obtained from diamines (for example hexamethylenediamine), polycarboxylic acids, in particular dimeric fatty acids and monocarboxylic acids, in particular fatty acids or the reaction product of one mol of diaminohexane with two mol of monoglycidyl ether or monoglycidyl ester, in particular glycidyl esters of α-branched fatty acids such as versatic acid, or c) compounds containing hydroxyl groups such as neopentyl glycol, bis-ethoxylated neopentyl glycol, neopentyl glycol ester of hydroxypivalic acid, dimethylhydantoin-N,N'-diethanol, 1,6-hexanediol, 2,5-hexanediol, 1,4-bis(hydroxymethyl)cyclohexane, 1,1-isopropylidene-bis(p-phenoxy)-2-propanol, trimethylolpropane, pentaerythritol or aminoalcohols such as triethanolamine, methyldiethanolamine or alkylketimines containing hydroxyl groups, such an aminomethylpropanediol-1,3-methylisobutylketimine or tris(hydroxymethyl)aminomethanecyclohexanoneketimine as well as polyglycol ethers, polyester polyols, polyether polyols, polycaprolactone polyols, polycaprolactam polyols of various functionalities and molecular weights, or d) saturated or unsaturated methyl esters of fatty acids which are esterified with hydroxyl groups of the epoxy resins in the presence of sodium methylate.

Primary and/or secondary amines are used as the component (B).

The amine should preferably be a water-soluble compound. Examples of such amines are monoalkylamines and dialkylamines, such as methylamine, ethylamine, propylamine, butylamine, dimethylamine, diethylamine, dipropylamine, methylbutylamine and the like. Alkanolamines, for example methylethanolamine, diethanolamine and the like are likewise suitable. Compounds which are also suitable are dialkylaminoalkylamines, for example dimethylaminoethylamine, diethylaminopropylamine, dimethylaminopropylamine and the like. Low-molecular amines are used in most cases, but it is also possible to use high-molecular monoamines.

The amines may also contain other groups, but these should not interfere with the reaction of the amine with the epoxide group and should not lead to gelling of the reaction mixture.

Secondary amines are preferably used as the components (B).

The charges required for water thinnability and electrical deposition may be produced by protonization using water-soluble acids (for example boric acid, formic acid, lactic acid and preferably acetic acid).

Another possibility for introducing cationic groups into the component (A) involves the reaction of epoxide groups of the component (A) with amine salts.

The cationic amine-modified epoxy resins may be employed both as non-self-crosslinking resins and as self-crosslinking resins. Self-crosslinking cationic amine-modified epoxy resins may be obtained, for example, by chemically modifying the cationic amine-modified epoxy resins. One way of obtaining a self-crosslinking system, for example, is to react the cationic amine-modified epoxy resin with a partly blocked polyisocyanate which has on average one free isocyanate group per molecule and whose blocked isocyanate groups become unblocked only at elevated temperatures.

Preferred electrocoating baths are obtained when non-self-crosslinking cationic amine-modified epoxy resins are used in combination with a suitable crosslinking agent as cathodically depositable resins.

Examples of suitable crosslinking agents are phenoplasts, polyfunctional Mannich bases, melamine resins, benzoguanamine resins, blocked polyisocyanates and compounds comprising at least two groups of the general formula $R^1$—O—CO—.

The radical $R^1$ is $R^2O$—CO—$CH_2$—, $R^3$—CHOH—$CH_2$—,
$R^4$—CHOR$^5$—CHOH—$CH_2$—, in which
$R^2$ is alkyl,
$R^3$ is H, alkyl, $R^6$—O—$CH_2$— or $R^6$—CO—O—$CH_2$—,
$R^4$ is H or alkyl,
$R^5$ is H, alkyl or aryl and
$R^6$ is alkyl, cycloalkyl or aryl.

Preferred electrocoating baths are obtained when blocked polyisocyanates are used as crosslinking agent.

Any polyisocyanates whose isocyanate groups may be reacted with a compound in such a way that the blocked polyisocyanate formed is unreactive toward hydroxyl and amino groups at room temperature, but becomes reactive at elevated temperatures, usually in the range from about 90° C. to about 300° C., may be used as blocked polyisocyanates. To prepare the blocked polyisocyanates, any organic polyisocyanates which are suitable for the crosslinking may be used. Isocyanates which contain about 3 to 36, in particular about 8 to about 15 carbon atoms, are preferred. Examples of suitable diisocyanates are hexamethylene diisocyanate, 2,4-toluylene diisocyanate, 2,6-toluylene diisocyanate and 1-isocyanatomethyl-5-isocyanato-1,3,3-trimethylcyclohexane. Polyisocyanates of higher isocyanate functionality may also be used. Examples of these are trimerized hexamethylene diisocyanate and trimerized isophorone diisocyanate. Furthermore mixtures of polyisocyanates may also be employed. Organic polyisocyanates which are suitable as crosslinking agents according to the invention, may also be prepolymers which are derived, for example, from a polyol including a polyether polyol or a polyester polyol.

Any suitable aliphatic, cycloaliphatic or aromatic alkylmonoalcohols may be employed for the blocking of the polyisocyanates, for example aliphatic alcohols such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols such as cyclopentanol and cyclohexanol; aromatic alkyl alcohols such as phenylcarbinol and methylphenylcarbinol.

Other suitable blocking agents are hydroxylamines, such as ethanolamine, oximes, such as methyl ethyl ketoxime, acetoxime and cyclohexanone oxime or amines, such as dibutylamine and diisopropylamine. The cited polyisocyanates and blocking agents may also be used in suitable proportions for the preparation of the partly blocked polyisocyanates referred to above.

Examples of compounds containing at least two groups of the general formula $R^1$—O—CO are bis-carbalkoxymethyl azelate, bis-carbalkoxymethyl sebacate, bis-carbalkoxymethyl terephthalate, bis-2-hydroxybutyl acetate and bis-2-hydroxyethyl terephthalate.

The crosslinking agent is usually employed in an amount from 5 to 60% by weight, preferably 20 to 40% by weight, based on the cationic amine-modified epoxy resin.

The electrocoating baths used according to the invention are formulated according to generally well known methods. The synthesis of the cathodically depositable resins is carried out by well known methods (cf. for example DE-OS 3,518,732, DE-OS 3,518,770, EP-A-4,090 and EP-A-12,463) in organic solvents. The resin solutions or dispersions obtained in this manner are converted to an aqueous phase in neutralized form.

Pigments are preferably incorporated into the aqueous dispersion of the cathodically depositable resins in the form of a pigment paste.

The preparation of pigment pastes is generally known and need not be elucidated here in greater detail (cf. D. H. Parker, Principles of Surface Coating Technology, Interscience Publishers, New York (1965); R. L. Yates, Electropainting, Robert Draper Ltd., Teddington/England (1966); H. F. Payne, Organic Coating Technology, Vol. 2, Wiley and Sons, New York (1961)).

The pigment pastes may in principle comprise all the pigments suitable for electrocoating paints. Titanium dioxide is generally the sole or the main white pigment.

However, other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate, may also be used. Cadmium yellow, cadmium red, carbon black, phthalocyanine blue, toluidyl red and hydrated iron oxide are examples of colored pigments which may be employed.

In addition to the pigments, the pigment paste may also comprise plasticizers, fillers, wetting agents etc.

The pigment paste is added to the aqueous dispersion of the cathodically depositable resin in such an amount that the finished electrocoating bath possesses the properties required for the deposition. In the majority of cases this ratio of pigment to cathodically depositable resin is 0.05 to 0.5 by weight.

In addition to the cathodically depositable resin and the pigment paste, the electrocoating baths used may contain further customary added substances, for example additives, antioxidants, surfactants etc.

The solids content of the electrocoating baths used according to the invention is preferably 7 to 35 parts by weight, particularly preferably 12 to 25 parts by weight. The pH of the electrocoating baths is between 4 to 9, perferably between 5 and 7.5.

The electrocoating bath is placed into contact with an electrically conducting anode and with the electrically conducting substrate connected as cathode. When electric current passes between anode and cathode, a strongly adhering paint film is deposited on the cathode.

The temperature of the electrocoating bath should be between 15° and 35° C., preferably between 20° and 30° C.

The applied voltage may fluctuate within a wide range and may lie, for example, between two and a thousand volts. However, typical operating voltages are between 50 and 500 volts. The current density is usually between about 10 and 100 amperes/m². Current density tends to fall off in the course of the deposition.

After deposition, the coated object is rinsed and prepared for baking.

The deposited paint films are generally baked at temperatures from 130° to 200° C. over a period from 10 to 60 minutes, preferably at 150° to 180° C. over a period from 15 to 30 minutes.

It is an essential part of the invention that in the process according to the preamble of claim 1 electrically conducting substrates, for example metals such as steel, aluminum, copper and the like used are coated by a coating produced by plasma polymerization.

The substrates may be coated by the well-known process of plasma polymerization (cf. for example H. Yasuda, Plasma Polymerization, Academic Press Inc., Orlando, Fla., (1985); N. Inagaki, H. Yasuda, Journal of Applied Polymer Science, Vol. 26, 3333-3341 (1981); EP-A-73,924, U.S. Pat. No. 3,518,108; H. Suhr in Houben-Weyl, Vol. IV/56, p. 1559 (1975); J. R. Hollaham and A. T. Bell, Techniques and Applications of Plasma Chemistry, J. Wiley, New York 1974; H. V. Boenig, Plasma Science and Technology, Carl Hauser-Verlag, Munich-Vienna 1982; H. K. Yasuda, Plasma Polymerization and Plasma Treatment, J. Wiley, New York 1984; H. K. Yasuda, Plasma Polymerization, Academic Press, New York 1985; H. Drost, Plasma Chemie, Akademie-Verlag, Berlin 1978). In the process of coating by plasma polymerization gaseous monomers or monomer precursors are formed by excitation in a plasma discharge and the corresponding polymers are deposited on the substrate surface. The assumption is that the monomers or monomer precursors formed and also fragmented by excitation react with each other and are condensed on the surface to be coated via oligomer formation. The growing surface layer is steadily bombarded with electrons and ions by the action of the electric discharge and this leads to a further reaction and to high-quality crosslinking of the polymer taking place.

Examples of suitable gaseous monomers or monomer precursors are methane, ethylene, acetylene, vinyl chloride, acrylonitrile, alkyl (meth)acrylates such as methyl (meth)acrylate, styrene, vinylidene chloride, vinyl acetate, propylene, (iso)butane, butadiene, isoprene, vinyl fluoride, tetrafluoroethylene, vinyl ethers, vinyl esters, ethylene oxide, acrylic acid, hexamethyldisilane, tetramethyldisiloxane, vinyltrimethoxysilane, hexamethyldisiloxane, divinyltetramethyldisiloxane, trivinylphosphine, divinylphosphine, vinyldiphenylphosphine and vinylalkylphosphines.

The coating by plasma polymerization may take place in such a manner, for example, that the substrate to be coated is placed between the two electrodes of a plasma reactor and the pressure inside the reactor is reduced to about $10^{-3}$ kPa.

The reaction gas, either as such or mixed with a carrier gas, is allowed to enter the reactor via a metering microvalve without arresting the vacuum pump. The inlet and outlet valves are set in such a way that the pressure of the gas is between $10^{-2}$ and 10 kPa. When the high frequency generator is switched on, the plasma is ignited and the space between the condenser plates begins to glow. The color of the plasma depends on the nature of the activated gas and may take on blue, green or red shades.

The shape of the plasma zone can be affected by gas pressure and/or by the frequency of the applied field and/or by superimposition of further electromagnetic fields. The dwell time of the substrate should be between a few seconds and about 10 minutes. When the plasma phase is terminated, the reactor space is aerated either with air or a protective gas or with a conventional monomer (plasma grafting).

The invention is elucidated by the example below.

1. Coating of a Conducting Substrate by Plasma Polymerization

The reactor used for plasma polymerization consists of a vacuum tank in the form of a horizontal cylinder with in-built parallel plates as electrodes. The panel to be coated, made from rolled, degreased automotive body steel, is placed in parallel between the electrodes. The tank is evacuated with the aid of a pump. During the polymerization a pressure of $8 \times 10^2$ Pa is maintained by pumping and simultaneous feeding of a monomer/inert gas mixture. The flow of the current of gas is maintained at 13 ml/min. Argon is used as the inert gas and vinyltrimethoxysilane as the monomer, the partial pressure of the monomer being defined by its saturation vapor pressure. At an electric discharge of 30 kHz and an output of 150 watt the desired coating is deposited in the course of 10 minutes. The high-frequency generator is then switched off and the equipment is aerated. At the end of the process the deposited coating consists of a brownish, transparent film.

2. Preparation of Aqueous Resin Dispersions Based on Cationic, Amine-modified Epoxy Resins 2.1 Preparation of a Dispersion According to Example B of EP-A-70,550

|  | Weight (g) |
|---|---|
| Epikote 829[1] | 727.6 |
| Capa 200[2] | 268.4 |
| Xylene | 36.1 |
| Bisphenol A | 197.8 |
| Dimethylbenzylamine | 3.8 |
| Isocyanate crosslinking agent[3] | 901.3 |
| Diketimine from MIBK and 75% diethylenetriamine in MIBK | 73.4 |
| N-Methylethanolamine | 59.1 |
| Hexyl glycol | 76.5 |
| Acetic acid | 33.5 |
| Emulsifier mixture[4] | 29.4 |
| Deionized water | 1793.1 |

[1] Epoxy resin from Shell Chemie, epoxide equivalent 188
[2] Polyester diol from Interox Chemical
[3] Isocyanate crosslinking agent based on toluylene diisocyanate masked with butyl glycol and reacted with trimethylolpropane in the ratio 3:1 in a 9:1 mixture of MIBK and n-butanol of a 70% solids content
[4] Mixture of emulsifiers based on Geigy Amine C (Geigy Industrial Chemicals) 120 parts, Surfynol 104 (Air Products and Chemicals) 120 parts, butyl glycol 120 parts and 221 parts of deionized water containing 19 parts of glacial acetic acid.
MIBK = methyl isobutyl ketone Procedure Epikote 829, Capa 200 and xylene are introduced into a reaction vessel and heated to 210° C. under $N_2$ protective gas. Water is then continuously removed for half an hour. The reaction mixture is then cooled to 150° C. and bisphenol A and 1.6 parts of dimethylbenzylamine are added. The mixture is then heated to 180° C. and this temperature is kept for half an hour. It is then cooled to 130° C. and the remainder of the dimethylbenzylamine is added. The temperature is then kept for 2½ hours, the isocyanate crosslinking agent, the diketimine and N-methylethanolamine are added and the temperature is kept for half an hour at 110° C. Hexyl glycol is then added. The reaction mixture is then dispersed in deionized water containing glacial acetic acid and the emulsifier mixture. Pressure is then reduced in order to remove low-boiling organic solvents. The mixture is adjusted to a solids content of 36%.

2.2 Preparation of a Dispersion According to Example 2 of DE-A-3,108,073

1093 parts of Araldite GY 2600 (epoxide equivalent weight EEW=188, epoxy resin based on bisphenol A from Ciba Geigy), 151 parts of neopentyl glycol and 4.9 parts of dimethylbenzylamine are introduced into a reaction vessel. The temperature is raised to 131° C. and kept at this level until an EEW of 415 is reached. 398 parts of Capa 200 (see section 2.1) are then added, followed by 3.8 parts of dimethylbenzylamine. The temperature is kept at 131° C. until an EEW of 1030 is reached. 1274 parts of the crosslinking agent (see section 2.1), 112 parts of the diketimine referred to in 2.1 and 86 parts of N-methylethanolamine are added and the temperature is kept for 1 hour at 112° C. 135 parts of phenoxypropanol and 40 parts of methoxypropanol are then added with mixing and mixing is continued for 15 minutes. This resin solution is dispersed in 3247 parts of water, 23.5 parts of glacial acetic acid and 21 parts of the emulsifier mixture (see section 2.1). The low-boiling solvents are then removed under reduced pressure and the solids content is adjusted to 35%.

3. Preparation of a Pigment Paste 3.1 Preparation of a Grinding Resin 800 parts of butyl glycol are added to 953 parts of a commercial epoxy resin based on bisphenol A of an epoxide equivalent weight of 890. The mixture is heated to 80° C. 221 parts of a reaction product from 101 parts of diethanolamine and 120 parts of an 80% aqueous lactic acid are then added to the resin solution. The reaction is carried out at 80° C. until the acid value has fallen to below 1.

3.2 Preparation of the Pigment Paste 2460 parts of $TiO_2$, 590 parts of an extender based on aluminum silicate, 135 parts of lead silicate, 37 parts of carbon black and 25 parts of lead octoate are added to a mixture of 1800 parts of the grinding resin and 2447 parts of deionized water and blended. This mixture is comminuted in a grinding aggregate to a Hegman fineness of 5 to 7. 1255 parts of deionized water are then added in order to achieve the required paste consistency.

3. Formulation of the Electrocoating Baths and Coating of the Substrate According to Section 1

196 parts of the pigment paste from section 3 are added to 500 parts by weight of the dispersions from section 2.1 or 2.2 and the solids content of the bath is adjusted to 20% by weight with deionized water. The deposition of the paint films is carried out for 2 minutes at 320 V. The bath temperature is 27° C. The films are rinsed with distilled water and baked at 180° C. for 20 minutes.

We claim:

1. A process for coating an electrically conducting substrate comprising:
(1) immersing the substrate in an aqueous electrocoating paint comprising at least one cathodically depositable resin,
(2) connecting the substrate as a cathode,
(3) depositing a film on the substrate using direct current,
(4) removing the substrate from the electrocoating paint and
(5) baking the deposited paint film,
wherein the electrically conducting substrate employed in the process is coated by a coating produced by plasma polymerization.

* * * * *